US008801421B2

(12) United States Patent
Odagi et al.

(10) Patent No.: US 8,801,421 B2
(45) Date of Patent: Aug. 12, 2014

(54) METHOD FOR FORMING TABLETS AND A ROLL PRESS TYPE APPARATUS THEREOF

(75) Inventors: Katsuaki Odagi, Toyokawa (JP); Seiji Fukunaga, Toyokawa (JP)

(73) Assignee: Sintokogio, Ltd., Aichi-ken (JP)

( * ) Notice: Subject to any disclaimer, the term of this patent is extended or adjusted under 35 U.S.C. 154(b) by 619 days.

(21) Appl. No.: 12/514,927

(22) PCT Filed: Nov. 13, 2007

(86) PCT No.: PCT/JP2007/071970
§ 371 (c)(1),
(2), (4) Date: Aug. 16, 2010

(87) PCT Pub. No.: WO2008/059818
PCT Pub. Date: May 22, 2008

(65) Prior Publication Data
US 2010/0301519 A1 Dec. 2, 2010

(30) Foreign Application Priority Data

Nov. 15, 2006 (JP) .................................. 2006-308700
Jan. 31, 2007 (JP) .................................. 2007-020633

(51) Int. Cl.
*B30B 11/16* (2006.01)
(52) U.S. Cl.
USPC ........................... 425/236; 425/237; 425/362
(58) Field of Classification Search
USPC ........................... 425/236, 237, 357, 362, 363
See application file for complete search history.

(56) References Cited

U.S. PATENT DOCUMENTS

| 2,662,246 A | | 12/1953 | Klugh et al. |
| 2,958,903 A | * | 11/1960 | Decker .......................... 425/195 |
| 3,677,683 A | | 7/1972 | Harris |
| 4,249,878 A | | 2/1981 | Komarek |
| 4,957,425 A | * | 9/1990 | Fay ................................ 425/362 |
| 5,576,033 A | * | 11/1996 | Herrera .......................... 425/363 |

FOREIGN PATENT DOCUMENTS

| DE | 659 920 C | 5/1938 |
| DE | 197 36 566 A1 | 2/1999 |
| EP | 2 116 363 A1 | 11/2009 |
| FR | 873 796 A | 7/1942 |

(Continued)

OTHER PUBLICATIONS

European Patent Office, "Supplementary European Search Report," Jan. 11, 2012, 6 pages, issued in EP 07 83 1700.

*Primary Examiner* — Robert B Davis
(74) *Attorney, Agent, or Firm* — Finnegan, Henderson, Farabow, Garrett & Dunner, L.L.P.

(57) ABSTRACT

A method for forming tablets using a roll press type apparatus for forming powdery material. The apparatus comprises two rolls for compressing tablets, wherein the rolls have a cylindrical shape and are arranged in the same direction, and can rotate toward their inner sides. When only one of the rolls has the plurality of cavities for forming tablets that are disposed on its outer surface, the speeds of their outer surfaces are controlled so that the speed of the roll that has the plurality of cavities on its outer surface is slower than that of the roll that has no cavity. Further, when both rolls have the plurality of cavities forming tablets that are disposed on their outer surfaces, the speeds of their outer surfaces are controlled so that the speeds of the rolls differ. Consequently, tablets that have a high dimensional accuracy and no burrs formed around them can be produced.

3 Claims, 5 Drawing Sheets

(56) References Cited

FOREIGN PATENT DOCUMENTS

| GB | 661 550 A | | 11/1951 |
| JP | 63-307204 A | | 12/1988 |
| JP | 63-3072074 | * | 12/1988 |
| JP | 02-063699 A | | 3/1990 |
| JP | 6-29632 | | 4/1994 |
| JP | 8-025096 | * | 1/1996 |
| JP | 08-025096 A | | 1/1996 |
| JP | 09-192896 | | 7/1997 |
| WO | WO 2008/105206 A1 | | 9/2008 |

* cited by examiner

METHOD FOR FORMING TABLETS AND A ROLL PRESS TYPE APPARATUS THEREOF

CROSS REFERENCE TO RELATED APPLICATIONS

This application is a national phase application based on international application No. PCT/JP2007/071970, filed Nov. 13, 2007, and claims priority of Japanese Patent Application No. 2006-308700, filed Nov. 15, 2006 and Japanese Patent Application No. 2007-020633, filed Jan. 31, 2007, the Content of all of which are incorporated herein by reference.

TECHNICAL FIELD

This invention relates to a method for forming a powdery material into tablets and a roll press type apparatus thereof. More particularly, it relates to a method for forming tablets by using an apparatus for forming powdery material, and to the apparatus. The apparatus comprises two rolls for compressing tablets, wherein the rolls have a cylindrical shape and a plurality of cavities for forming tablets that are disposed on the outer surface of at least one of the rolls. The two rolls are arranged in the same direction, and can rotate toward their inner sides.

BACKGROUND OF THE INVENTION

Conventionally, a briquetting machine is used as one of the roll press type forming machines for compressing and forming powdery material. The briquetting machine comprises a pair of rolls, and a hopper for supplying powdery material to the pair of rolls. The pair of rolls comprises a fixed rotary roll and a movable rotary roll that is pressed toward the fixed rotary roll by a hydraulic cylinder. The hopper is disposed above the pair of rolls and comprises a feeding screw that compresses and feeds the powdery material to the pair of rolls. The powdery material that is compressed and fed by the feeding screw is formed into briquettes by the pair of rolls. (See Patent Document 1.)

Patent Document 1: Japanese Patent Laid-open Publication No. H9-192896

By using the conventional briquetting machine that has the technical features explained in the above paragraph, it has been tried to compress powdery material and to form it into tablets that have high dimensional accuracy and no burrs. However, when the conventional briquetting machine is used for forming the tablets, the tablets are formed with a sheet-like portion as shown in FIG. 4. Thus, the tablets must be separated from the sheet-like portion by any well-known means. However, as shown in FIG. 5, the burrs remain around the tablets after separating the tablets from the sheet-like portion. Thus, there is a problem in that no product that is to be used as a tablet can be produced.

DISCLOSURE OF INVENTION

This invention has been conceived based on this circumstance. The purpose of this invention is to provide a method for forming tablets that have a high dimensional accuracy and no burrs, and an apparatus thereof.

The inventors completed the present invention based on the following facts that they found.

Namely, they studied a phenomenon causing burrs around a tablet by using an apparatus for compressing and forming a powdery material into tablets. The apparatus comprises two rolls for compressing tablets. The rolls have a cylindrical shape and a plurality of cavities for forming tablets that are disposed on the outer surface of at least one of the rolls. The two rolls are arranged in the same direction, and can rotate toward their inner sides.

Consequently, when only one of the rolls has a plurality of cavities for forming tablets that are disposed on its outer surface, then by controlling the speeds of their outer surfaces so that the speed of the roll that has the plurality of cavities on its outer surface is slower than that of the roll that has no cavity, the burrs can be prevented from being formed around the tablets. Similarly, when both rolls have the plurality of cavities for forming tablets that are disposed on their outer surfaces, then by controlling the speeds of their outer surfaces so that the speeds of the rolls differ, burrs can be prevented from being formed around the tablets. The reason is that this operation causes not only the compression of the powdery material, but also generates a shearing force at the outer surface of the tablets along the outer surface of the roll.

To achieve the purpose of the present invention explained previously, the invention has the following technical features:

The invention relates to a method for forming tablets by using a roll press type apparatus for forming powdery material. The apparatus comprises two rolls for compressing tablets, wherein the rolls have a cylindrical shape and are arranged in the same direction, and can rotate toward their inner sides. When only one of the rolls has the plurality of cavities for forming tablets that are disposed on its outer surface, the speeds of their outer surfaces are controlled so that the speed of the roll that has the plurality of cavities on its outer surface is slower than that of the roll that has no cavity.

The invention also relates to a method for forming tablets by using a roll press type apparatus for forming powdery material. The apparatus comprises two rolls for compressing tablets, wherein the rolls have a cylindrical shape and are arranged in the same direction, and can rotate toward their inner sides. When both rolls have the plurality of cavities for forming tablets that are disposed on their outer surfaces, the speeds of their outer surfaces are controlled so that the speeds of the rolls differ.

Incidentally, the wording "the rolls are arranged in the same direction" used in the above paragraphs means "the rolls are arranged so that the centerlines of them are parallel to each other, and so that the outer surfaces face each other." The wording "the rolls can rotate toward their inner sides" used in the above paragraphs means "the rolls can rotate in opposite directions so that the outer surfaces of the rolls move toward the same position, as shown by arrows in FIG. 1."

For the present invention, rolls that have different diameters may be used to vary the speeds of the outer surfaces of both rolls.

For the present invention, when it is hard for the tablets, which are formed by compressing a powdery material in the plurality of cavities, to be taken out from the cavities, the tablets may be taken out from the cavities by a means for taking out the tablets that is additionally disposed at the cavities of the rolls.

As explained in the above paragraphs, the present invention has these technical features:

The method for forming tablets uses a roll press type apparatus for forming powdery material. The apparatus comprises two rolls for compressing tablets, wherein the rolls have a cylindrical shape and are arranged in the same direction, and can rotate toward their inner side. When only one of the rolls has the plurality of cavities for forming tablets that are disposed on its outer surface, the speeds of their outer surfaces are controlled so that the speed of the roll that has the plurality of cavities on its outer surface is slower than that of the roll that has no cavity. Further, when both rolls have the plurality of cavities for forming tablets that are disposed on their outer surfaces, the speeds of their outer surfaces are controlled so that the speeds of the rolls differ.

Thus, when the powdery material is compressed and formed into the tablets, since a shearing force is generated at the outer surfaces of the tablets along the outer surface of the roll, tablets that have a high dimensional accuracy and no burrs formed around them can be produced. Namely, the present invention has excellent practical effects.

BRIEF DESCRIPTIONS OF THE DRAWINGS

PREFERRED EMBODIMENTS OF THE INVENTION

Figure 1:
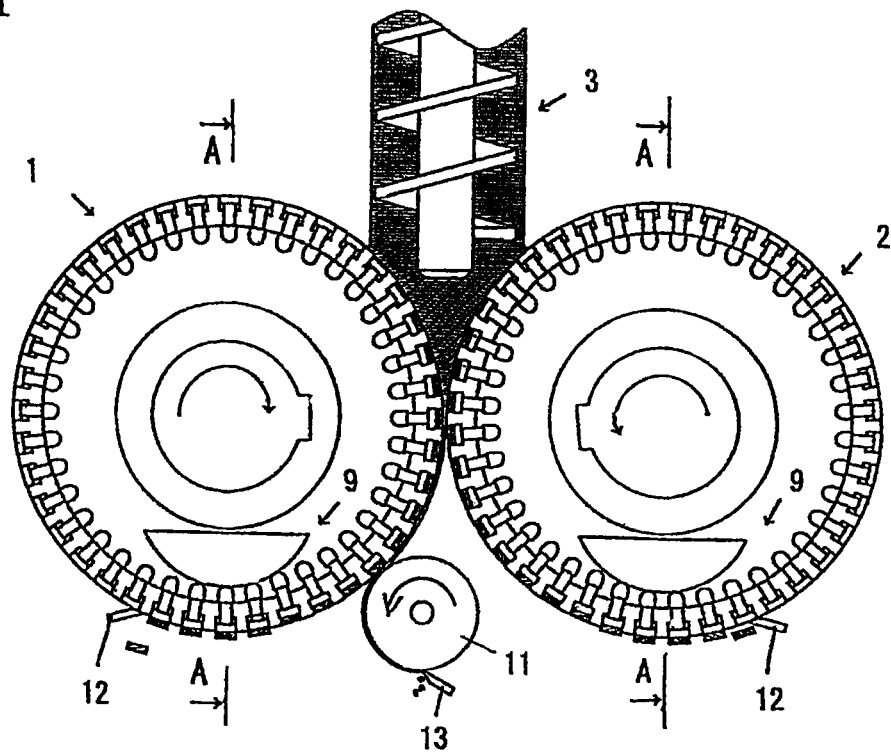
FIG. 1 shows a schematic diagram of the main part of a first embodiment of the roll press type apparatus for forming the tablets of the present invention.

Below, one embodiment of a roll press type apparatus for forming the tablets of the present invention is explained based on FIGS. 1-3. As shown in FIG. 1, the roll press type apparatus for forming tablets has these technical features:

The apparatus comprises two rolls 1, 2 for compressing and forming tablets, wherein each roll has a cylindrical shape and is arranged so that its centerline extends in the front to back direction. Further, both rolls 1, 2 can rotate toward their inner sides as shown by the arrows in FIG. 1 to form a powdery material into tablets. The apparatus further comprises a screw feeder 3 for feeding a powdery material between the rolls 1, 2, wherein the screw feeder 3 is disposed above and between the rolls 1, 2.

The rolls 1, 2 can be rotated by means of electric motors and well-known reducers (not shown) so that the speeds of the peripheral surfaces of the rolls 1, 2 differ. As shown in FIG. 2, each of the two rolls 1, 2 comprises a peripheral section 4 having a cylindrical shape, a boss section 5 having a cylindrical shape, and a connecting plate 6 having a doughnut-like shape. The connecting plate 6 connects the peripheral section 4 and the boss section 5 at the left side of them (corresponding to the rear side in FIG. 1). Further, a number of cavities 7, 7 for forming tablets are disposed on the peripheral section 4. An ejecting means 9 for pushing the tablets out of the cavities 7, 7 is disposed at each roll. The ejecting means 9 comprises pistons 8, 8 disposed in the cavities 7, 7, a pushing member 10 having a semicircular shape at its cross-section, and a support member 14 that holds the pushing member 10. The pistons 8, 8 are arranged so that they extend in the radial direction and can slide within the cavities 7, 7 for a predetermined distance. The pushing member 10 is fixed and disposed at the lower portion of the rolls 1, 2 and between the peripheral section 4 and the boss section 5, and can push the pistons 8, 8 toward the outer side of the rolls 1, 2.

For the roll press type apparatus for forming the tablets of this invention, the diameter of each of both rolls 1, 2 is 115 mm. Further, the cavities 7, 7 for forming tablets have a cylindrical shape having an inner diameter of 5.5 mm. The pistons 8, 8 can move 2 mm within the cavities 7, 7.

As shown in FIG. 1, at the obliquely lower position of the left roll 1, an auxiliary roll 11 is disposed so that its outer surface faces that of the roll 1. The auxiliary roll 11 has a cylindrical shape and is arranged in the same direction as that of the roll 1. The auxiliary roll 11 rotates in the opposite direction of the roll 1, as shown by the arrow in FIG. 1, so that the speed of the surface of it is faster than that of the roll 1.

The numbers 12 and 13 in FIG. 1 denote scrapers that are fixed at the surfaces of the rolls 1, 2 and the auxiliary roll 11.

For the roll press type apparatus for forming tablets having the technical features explained in the above paragraphs, the surface of left roll 1 rotates at a speed of 0.018 m/sec, and the surface of right roll 2 rotates at a speed of 0.012 m/sec, in the direction shown by the arrows in FIG. 1. After the screw feeder 3 starts to be driven, a powdery material such as a powdery salt is poured in the screw feeder 3, and then it is fed between the rolls 1, 2. The powdery salt is compressed and formed in the cavities 7, 7 of the rolls 1, 2 into tablets that have a cylindrical shape and that are short. Then, since the difference between the speed of the peripheral surface of the roll 1 and that of the roll 2 causes a shearing force at the outer surface of the compressed and formed tablets along the outer surface of the roll 2, the burrs of the tablets disposed in the cavities 7, 7 of the right roll 2 are removed.

After the burrs of the tablets disposed in the cavities 7, 7 of the right roll 2 are removed, the tablets move to the ejecting means 9 disposed in the right roll 2. Then, since the plurality of the pistons 8, 8 are pushed by the pushing member 10 of the ejecting means 9 by means of the rotation of the roll 2, the tablets in the plurality of the cavities 7, 7 are sequentially ejected from the cavities 7, 7. Consequently, tablets that have a high dimensional accuracy and no burrs, as shown in FIG. 3, can be produced by means of the processes explained above.

In contrast, the tablets that are formed in the cavities 7, 7 of the left roll 1 have burrs around them and move to the position where the auxiliary roll 11 is located. Then, the burrs are removed from the tablets by the auxiliary roll 11, which rotates with a speed at its surface of 0.027 m/sec in the direction shown by arrows in FIG. 1, which speed is faster than that of the left roll 1. Consequently, the same type of tablets, which have no burrs, as produced by the cavities 7, 7 of the right roll 2, are produced.

Figure 2:
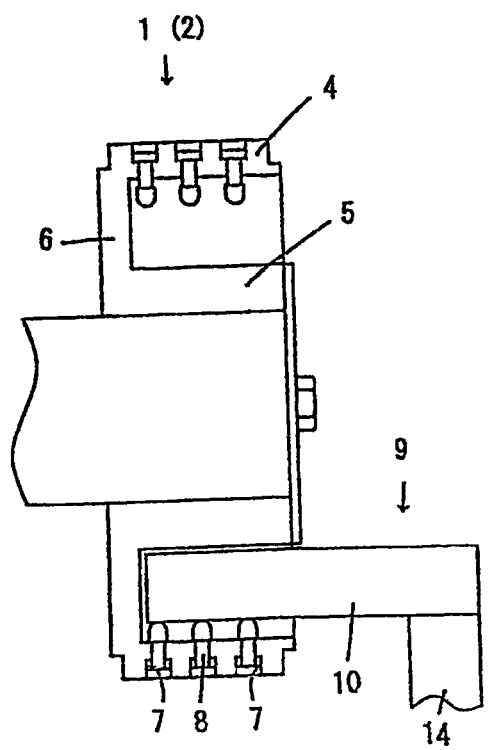
FIG. 2 shows a sectional view at line A-A of FIG. 1.
Figure 3:
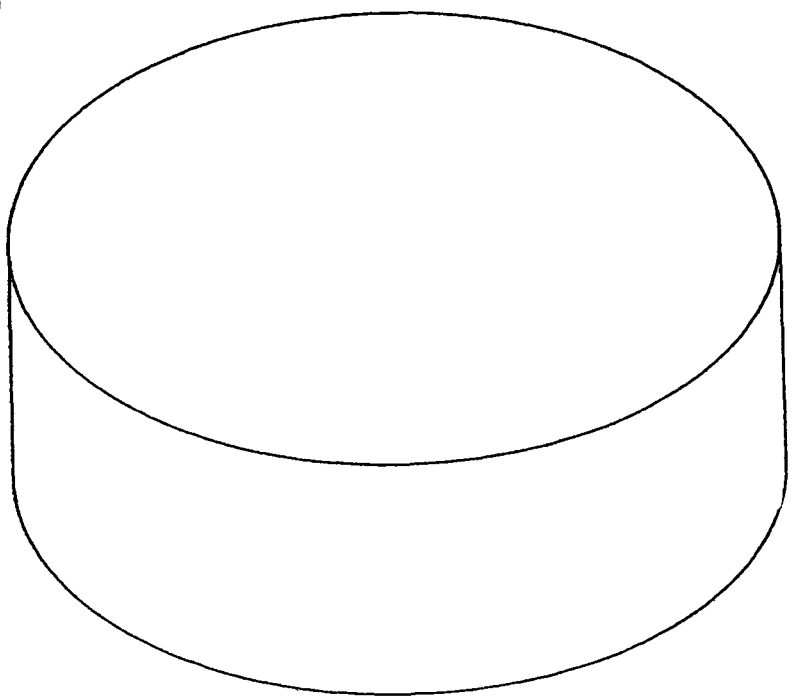
FIG. 3 shows a perspective view of the tablet that is formed by means of the roll press type apparatus shown by FIG. 1.
Figure 4:
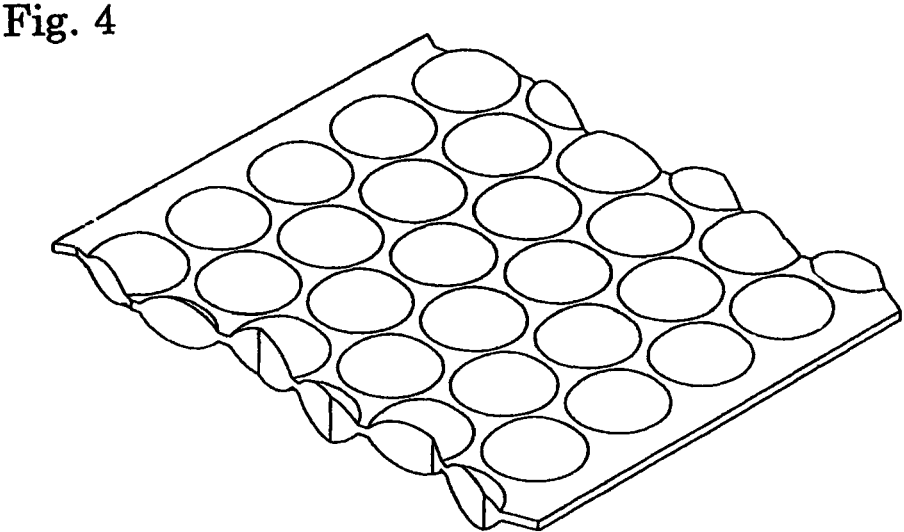
FIG. 4 shows a perspective view of the products that are formed by means of a briquetting machine.
Figure 5:
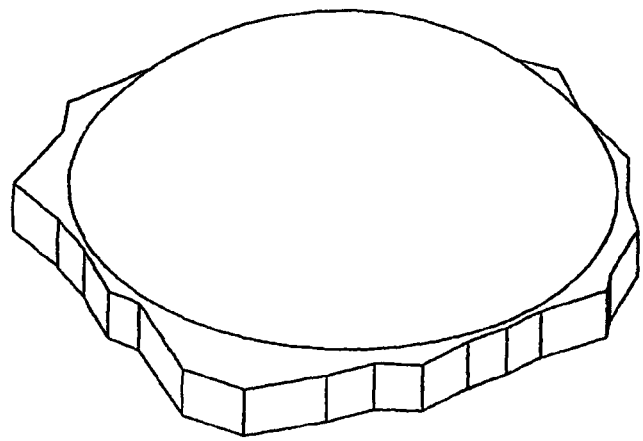
FIG. 5 shows the tablets that are separated from a sheet-like portion of the products shown by FIG. 4 by a well-known means.

For the embodiment explained in the above paragraphs, the roll press type apparatus includes the ejecting means 9 comprising pistons 8, 8, a pushing member 10, and a support member 14, as shown in FIG. 2. However, the ejecting means 9 is not limited to this technical feature. For example, an ejecting means 9 that uses an injection of compressed air to eject the tablets can be used.

Further, for the embodiment explained in the above paragraphs, the roll press type apparatus has a structure such that the rolls 1, 2 are disposed at the left and right sides of the apparatus, and the screw feeder 3 is disposed above and between the rolls 1, 2. However, the apparatus is not limited to this technical feature.

Figure 6:
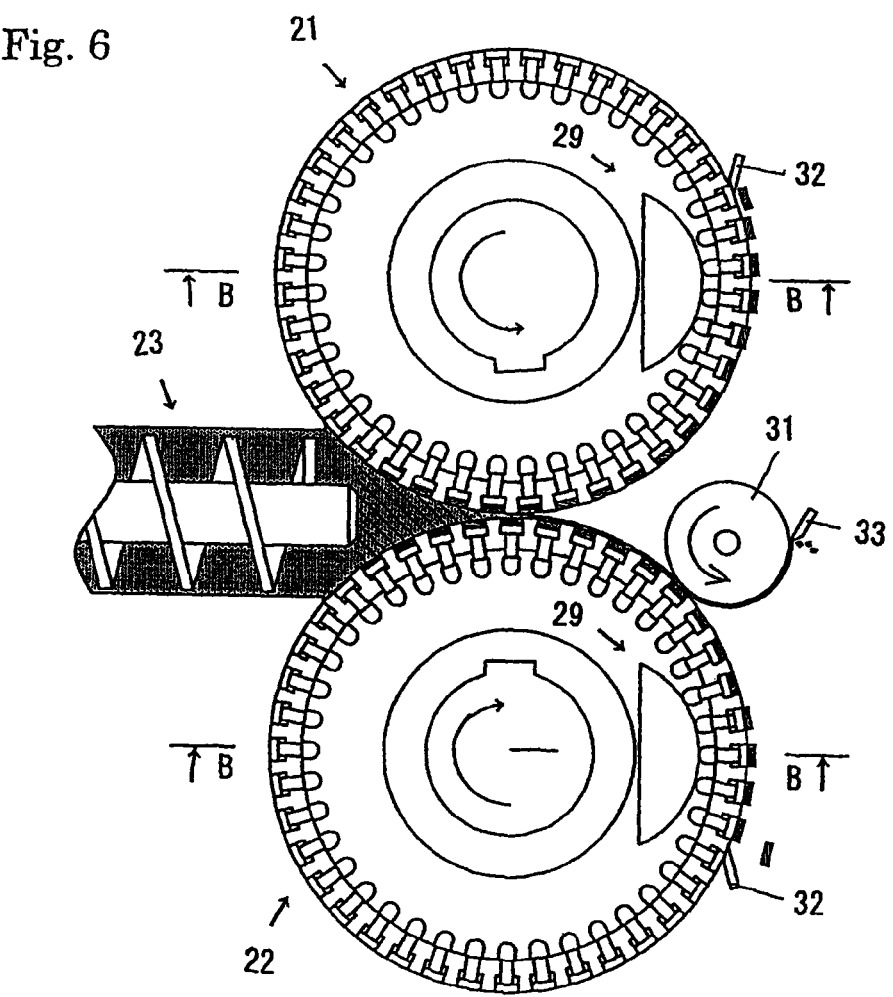
FIG. 6 shows a schematic diagram of the main part of a second embodiment of the roll press type apparatus for forming the tablets of the present invention.
Figure 7:
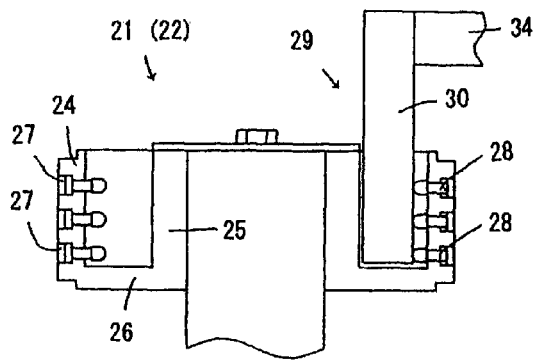
FIG. 7 shows a sectional view at line B-B of FIG. 6.

For example, the structure having the technical feature shown in FIGS. 6 and 7 can be used. Namely, the roll press type apparatus has these technical features:

The apparatus comprises two rolls 21, 22 for compressing and forming tablets, wherein each roll has a cylindrical shape and is arranged so that its centerline extends in the front to back direction. Further, the rolls 21, 22 can rotate toward their inner sides as shown by the arrows in FIG. 6 to form a powdery material into tablets. The apparatus further comprises a screw feeder 23 for feeding a powdery material between the rolls 21, 22, wherein the screw feeder 23 is disposed at the left sides of the rolls 21, 22, and its centerline is located between the rolls 21, 22.

The rolls 21, 22 can be rotated by means of electric motors and well-known reducers (not shown) so that the speeds of the peripheral surfaces of the rolls 21, 22 differ. As shown in FIG. 7, each of the two rolls 21, 22 comprises a peripheral section 24 having a cylindrical shape, a boss section 25 having a cylindrical shape, and a connecting plate 26 having a doughnut-like shape. The connecting plate 26 connects the peripheral section 24 and the boss section 25 at the lower side of them (corresponding to the rear side in FIG. 6). Further, a number of cavities 27, 27 for forming tablets are disposed on the peripheral section 24. An ejecting means 29 for pushing the tablets out of the cavities 27, 27 is disposed at each roll. The ejecting means 29 comprises pistons 28, 28 disposed in the cavities 27, 27, a pushing member 30 having a semicircular shape at its cross section, and a support member 31 that holds the pushing member 30. The pistons 28, 28 are arranged so that they extend in the radial direction and can slide within the cavities 27, 27 for a predetermined distance. The pushing member 30 is fixed and disposed at the right portion of the rolls 21, 22 and between the peripheral section 24 and the boss section 25, and can push the pistons 28, 28 toward the outer sides of the rolls 21, 22.

For the roll press type apparatus for forming tablets of this embodiment, the diameter of each of both rolls 21, 22 is 115 mm. Further, the cavities 27, 27 for forming tablets have a cylindrical shape having an inner diameter of 5.5 mm. The pistons 28, 28 can move 2 mm within the cavities 27, 27.

As in FIG. 6, at the oblique upper position of the lower roll 22, an auxiliary roll 31 is disposed so that its outer surface faces that of the roll 22. The auxiliary roll 31 has a cylindrical shape and is arranged in the same direction as that of the roll 22. The auxiliary roll 31 rotates in the opposite direction from the roll 22, as shown by the arrow in FIG. 6, so that the speed of the surface of it is faster than that of the roll 22.

The numbers 32 and 33 in FIG. 6 denote scrapers that are fixed at the surfaces of the rolls 21, 22 and the auxiliary roll 31.

For the roll press type apparatus for forming tablets having the technical features explained in the above paragraphs, the lower roll 22 rotates with the speed of its surface at 0.018 m/sec, and the upper roll 21 rotates with the speed of its surface at 0.012 m/sec, in the direction shown by the arrows in FIG. 6. After the screw feeder 23 starts to be driven, a powdery material such as a powdery salt is poured in the screw feeder 23, and then it is fed between the rolls 21, 22. The powdery salt is compressed and formed in the cavities 27, 27 of the rolls 21, 22 into tablets that have a cylindrical shape and a short length. Then, since the difference between the speed of the peripheral surface of the roll 21 and that of the roll 22 causes a shearing force at the outer surface of the compressed and formed tablets along the outer surface of the upper roll 21, the burrs of the tablets disposed in the cavities 27, 27 of the upper roll 21 are removed.

After the burrs of the tablets disposed in the cavities 27, 27 of the upper roll 21 are removed, the tablets move to the ejecting means 29 disposed in the upper roll 21. Then, since the plurality of the pistons 28, 28 are pushed by the pushing member 30 of the ejecting means 29 by means of the rotation of the roll 21, the tablets in the plurality of the cavities 27, 27 are sequentially ejected from the cavities 27, 27. Consequently, tablets that have high dimensional accuracy and no burrs, as shown in FIG. 3, can be produced by means of the processes explained above.

In contrast, the tablets that are formed in the cavities 27, 27 of the lower roll 22 have burrs around them, and the tablets move to the position where the auxiliary roll 31 is located. Then, the burrs are removed from the tablets by the auxiliary roll 31 that rotates with a speed at its surface of 0.027 m/sec in the direction shown by arrows in FIG. 6, which speed is faster than that of the lower roll 22. Consequently, the same tablets, which have no burrs, as produced by the cavities 27, 27 of the upper roll 21 are produced.

For the second embodiment, explained in the above paragraphs, the roll press type apparatus includes the ejecting means 29 comprising pistons 28, 28, a pushing member 30, and a support member 34, as shown in FIG. 7. However, the ejecting means 29 is not limited to this technical feature. For example, an ejecting means 29 using an injection of compressed air to eject the tablets can be used.

The powdery material consists of various particulate materials and granular materials, such as: salt, a medicinal agent, fertilizer and manure, feedstuff, ceramics (alumina, zirconia, glass), a catalyst, raw materials for a battery cell, resins (fluorine resin, melamine resin, epoxy resin, toner resin, etc.), other chemical compounds, a metal, a metal oxide, a metal compound (ferrite, copper, zinc, brass, tungsten, aluminum, silicone, bronze, manganese, ferric oxide, titanic oxide, nickel oxide, copper oxide, zinc oxide, magnesia oxide, aluminum oxide, indium oxide, chrome oxide, niobium oxide, vanadium oxide, magnesium hydrate, nickel hydrate, nickel sulfide, ferric sulfide, lead sulfide, nickel chloride, zinc stearate, etc.), metallic waste (chips of carbon steel, cast iron, cast steel, copper, brass, aluminum, or silicone, etc., chips of a milled aluminum can, or sludge of a ground metal), a natural material, biomass materials, a composite material containing a fibrous material, food or wastes of food (sugar, salt, cornstarch, rice flour, corn flour, bean curd refuse, rice bran, rice hulls, or lactose, etc.), other inorganic and organic materials, compounds thereof, wastes thereof (shells, sawdust, cow chips and other carbides, poultry manure and other carbides, carbides of municipal solid waste, dust and sludge from manufacturing iron, dust in a steel converter, fly ash, chaffs of paint, plastic waste, shredder dust, collected dust, milled concrete, polluted sludge, incinerated ash of polluted sludge, bentonite, boracic acid, polyester, chloroethene, white carbon, coke, graphite, calcium oxide, calcium hydroxide, a bleaching powder, activated carbon, silica gel, zeolite, coal, cellulose, a talc powder, dolomite, a magnetic powder, calcium chloride, calcium peroxide, silicate calcium, sodium bicarbonate, sodium silicate, ammonium nitrate, ammonium sulfate, potassium nitrate, kalium carbonate, potassium iodide, potassium titanate, calcium carbonate, calcium titanate, calcium phosphate, silicon nitride, silver nitrate, nitrate of soda, etc.). The powdery material is not limited by its composition or its kind.

Figure 8:
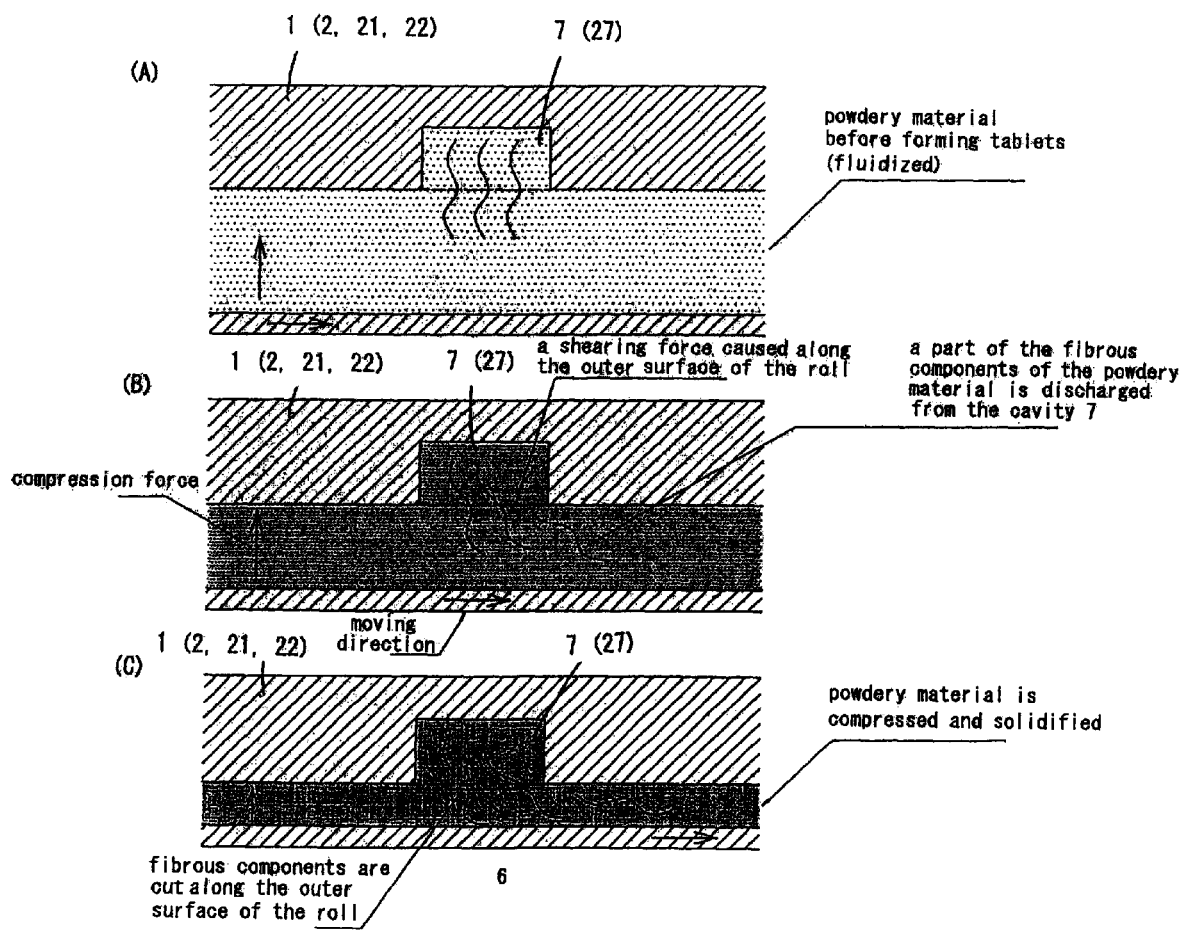
FIG. 8 shows a schematic diagram for explaining a mechanism to form a tablet when the apparatus of the present invention is used in an industrial application.

Next, by using the roll press type apparatus explained in the above paragraphs, the mechanism for forming a powdery material (feedstuff) that contains fibrous component into tablets is explained based on FIG. 8. It is a diagram showing the processes of this invention based on assumptions.

As shown in FIGS. 1 and 6, the screw feeder 3 or 23 feeds a powdery material between the rolls 1, 2 or 21, 22 that are rotating in the direction shown by the arrows. The powdery material contains fibrous components. (In this case, only the rolls 2 and 21 have cavities for forming tablets. Below, only the rolls 1, 2 are referred to.) As shown in FIG. 8(A), initially the material is powdery. As shown in FIG. 8(B), the powdery material is squeezed in the cavity 7 or 27 (below, only the cavity 7 is referred to) for forming the tablets, and then is compressed and solidified. Then a part of the fibrous components of the powdery material is discharged from the cavity 7. As shown in FIG. 8(C), then the powdery material in the cavity 7 and that between the rolls 1, 2 is further compressed and solidified. Then, because of the difference between the speeds of the outer surfaces of the rolls 1, 2, the tablet formed in the cavity 7 is separated from the solidified powdery material between the rolls 1, 2, and a part of the fibers contained in the cavity 7 is cut at the surfaces of the rolls 1, 2 and separated from the solidified powdery material between the rolls 1, 2. Consequently, the process for producing the tablets that contain a fibrous component is completed.

Incidentally, by means of the conventional briquetting machine as disclosed in Patent Document 1, forming into tablets a powdery material containing a fibrous component was attempted. However, for the conventional briquetting machine, the fibrous component could not be cut in the process for forming tablets. Namely, since the fibrous component remained between the tablets and the burrs, and since the tablets and burrs were made denser, the boundary layers between the products of the tablets and burrs were reinforced. Thus, since the tablets and burrs could not be separated by any well-known means, no products having burrs were produced.

Figure 9:
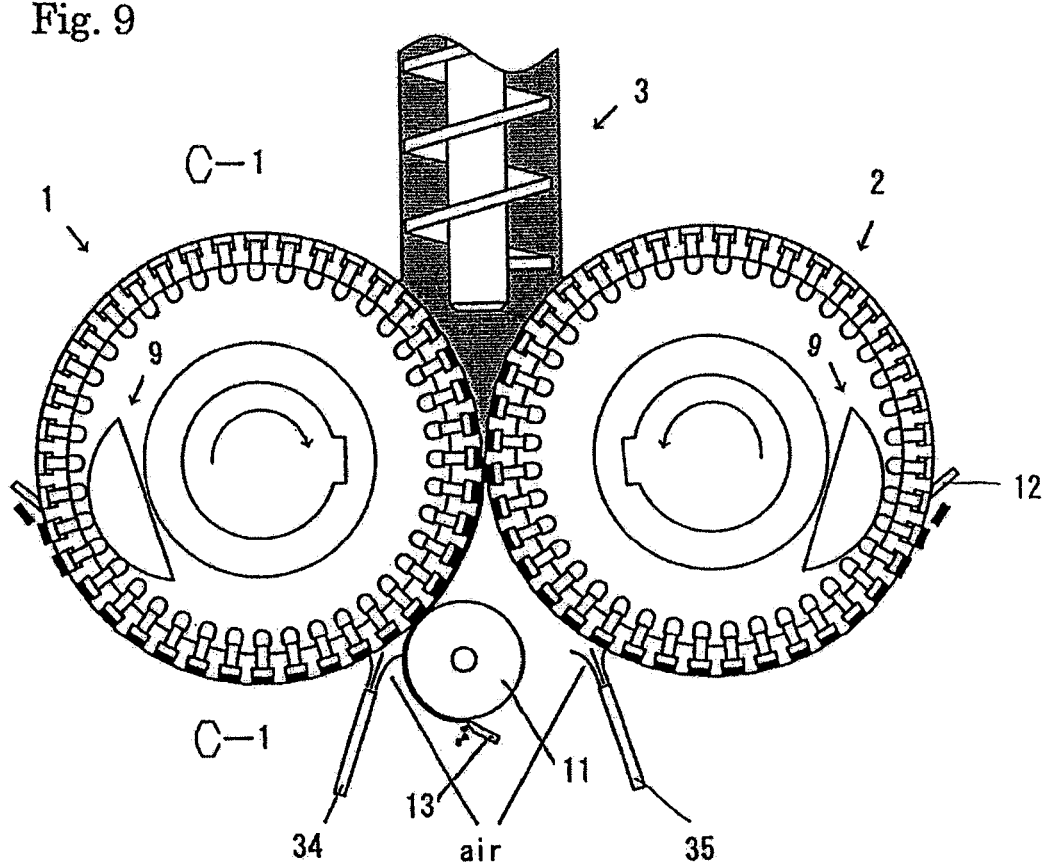
FIG. 9 shows a schematic diagram of the main part of a third embodiment of the roll press type apparatus for forming the tablets of the present invention.
Figure 10:
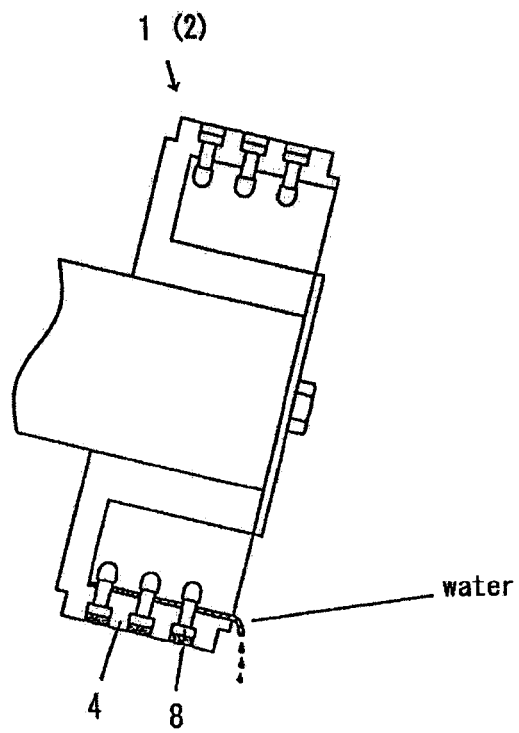
FIG. 10 shows a sectional view at line C-C of FIG. 9.

When the powdery material contains a fluid, it is preferable that the heads of the pistons 8, 8 have permeability so that the fluid can go through the heads. It is also preferable to enlarge the clearance between the peripheral section 4 and pistons 8, 8 so that the fluid easily goes through the clearance and is discharged from the apparatus when the powdery material is compressed in the cavities 7, 7. Further, as in FIG. 9, nozzles 34, 35 for blowing air toward the tablets to dry them may be disposed, if necessary. Further, as shown in FIG. 10, if necessary the rolls 1, 2 may be arranged so that their front sides are lowered to discharge the fluid that goes, through the clearance between the peripheral section 4 and pistons 8, 8, from the powdery material under the fluid's own weight. Further, the fluid that goes through the clearance between the peripheral section 4 and pistons 8, 8 may be removed by a sucking means.

What we claim is:

1. An apparatus for forming a powdery material into tablets, comprising:
    two rolls for compressing powdery material to form the tablets, wherein the rolls have a cylindrical shape and are arranged in the same direction, and can rotate toward their inner sides, wherein both rolls have a plurality of cavities for forming tablets, which are disposed on the outer surfaces of the rolls, means for rotating the rolls, means for controlling the speeds of the outer surfaces of the two rolls so that the speed of the outer surface of one roll of the two rolls is faster than the speed of the outer surface of the other roll of the two rolls, whereby each roll having the plurality of cavities acts as an independent device for forming the tablets of the powdery material, and an auxiliary roll having a cylindrical shape disposed on the surface of the one roll, that rotates faster than that of the other roll, wherein the auxiliary roll is arranged in the same direction as that of the one roll, and means for rotating the auxiliary roll so that the speed of the outer surface of the auxiliary roll is faster than the speed of the outer surface of the one roll, wherein the auxiliary roll is arranged so that the outer surface of the auxiliary roll faces that of the one roll and rotates in the opposite direction of that of the one roll.

2. The apparatus of claim 1, further comprising an ejecting means for pushing out the tablets within the cavities of each roll.

3. The apparatus of claim 2, wherein the ejecting means comprises pistons disposed in the cavities of the roll, wherein the pistons can slide for a predetermined distance in the radial direction of the roll, and a pushing member for pushing the pistons to the peripheral surface of the roll, wherein the pushing member is fixed to the apparatus.

* * * * *